United States Patent Office 2,946,443
Patented July 26, 1960

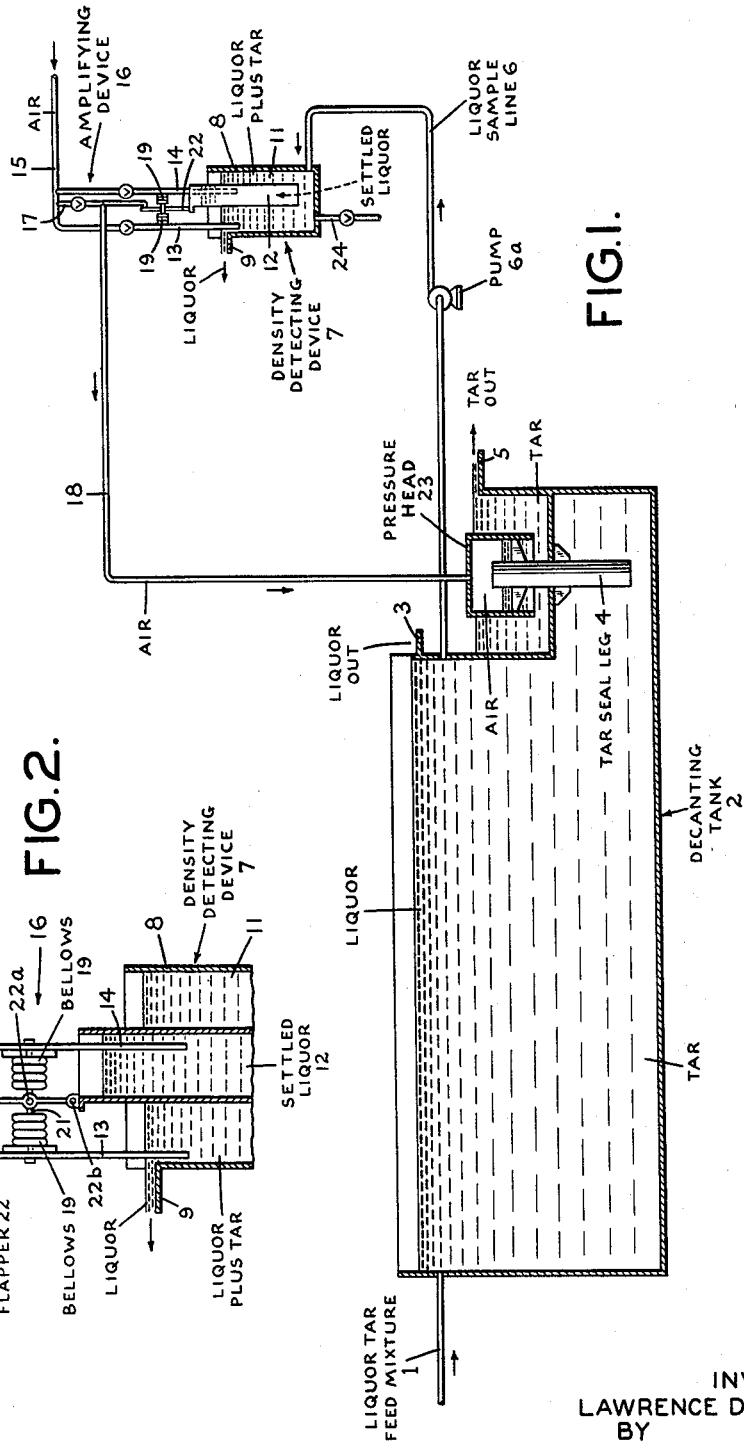

2,946,443

DECANTER CONTROL

Lawrence D. Schmidt, New York, N.Y., assignor to Allied Chemical Corporation, a corporation of New York Filed May 1, 1958, Ser. No. 732,297

6 Claims. (Cl. 210—83)

The present invention relates to separation by decantation of a liquid mixture of relatively light and relatively heavy immiscible and difficultly separable liquid components. More particularly, the invention relates to novel process and apparatus for automatically controlling gravity-operated decanting tanks used in effecting continuous separation of a liquid mixture of immiscible, relatively light and relatively heavy liquid components.

The invention will be particularly exemplified in regard to the automatic control of gravity-operated decanting tanks used in continuous separation of mixtures of tar and aqueous liquor, but it should be evident that the invention is not limited thereto and can be used to control the separation of any immiscible, relatively light and relatively heavy liquid components. For example, the invention can be used to separate crude oil from water in oil fields, acid sludges or water from oil in refineries, uranium salts in organic solvents from aqueous solutions, solvent extracts from hydrocarbons in refining petroleum products, extracts from fractions of coke-oven light oil in refining operations, etc.

In the production of coke from carbonaceous materials, the carbonaceous material is first heated in the absence of air to produce hot gases containing tar, hydrocarbons such as benzene, naphthalene and anthracene, nitrogenous compounds such as ammonia and cyanide, in addition to phenols, hydrogen, carbon monoxide and lower paraffins. It is highly desirable to recover as many of these materials as is possible, the heavier materials being separated into their respective components and the lighter ends being used for fuel.

Generally speaking, gas exits coke ovens at a temperature of about 900° to 1200° F. This hot gas is sprayed in a collecting main with aqueous liquor, thereby reducing the temperature of the gas to a temperature upwards of about 170° F., usually about 174° to 180° F., and scrubbing out the major portion (e.g. about 60%) of the tar (heavy oils). The mixture of aqueous liquor and tar is then introduced into a suitable decanting tank wherein the tar separates, forming a lower layer and leaving the aqueous layer as an upper layer. The separated tar is used "as is" or is charged to a fractionating column for further separation into its various components. The separated aqueous liquor is suitably recirculated for treatment of additional hot gas exiting the coke ovens.

According to conventional continuous operation, the aqueous liquor-tar mixture has been separated by continuously passing the mixture into an atmospheric pressure (gravity) decanting tank, thereby forming a tar layer underlying an aqueous liquor layer. The aqueous liquor is continuously removed from the top of the tank while the tar is continuously discharged from the bottom of the tank. However, this operation is highly sensitive to the variations normally occurring in the tar content of the mixture, as well as to the variations in tar quality which effect substantial changes in settling characteristics of the mixture. Thus, this procedure has been found to result frequently in production of tar having an unacceptably high water content and requiring dehydration treatment, thereby materially increasing operating costs. Moreover, even when a satisfactory tar product is produced, the separated aqueous liquor often contains prohibitive quantities of tar, i.e., in excess of about 2% by weight of the liquor. This is highly disadvantageous since in normal operation the separated liquor is recirculated as spray for quenching additional hot coke oven gas. When the aqueous liquor contains too much tar, the tar carbonizes, plugs the spray devices and creates serious operating difficulties.

In an effort to develop a continuous process for producing high quality tar product and aqueous liquor which does not contain objectionable amounts of tar, a seal leg has been employed in the decanting tank for the removal of the tar as overflow. Position of the seal leg is determined by frequent analyses of samples of aqueous liquor withdrawn at a fixed point from the decanting tank. When the liquor sample contains more or less tar than a predetermined amount, the seal leg is lowered or raised to permit increased or decreased rate of tar withdrawal and, accordingly, decreased or increased residence time of tar. In the case of increased rate of tar withdrawal and decreased residence time of tar, there is a corresponding decrease in rate of liquor withdrawal and increase in liquor residence time. On the other hand, when the rate of tar withdrawal decreases and tar residence time increases, there is increased rate of liquor withdrawal and decreased liquor residence time. When the tar reaches its new level, as determined by the position of the seal leg, normal operation is resumed.

Manual control of liquor and tar separation by periodically raising and lowering of the seal leg has proved to be unsatisfactory. Thus, should a slowly separating interphase of water in tar enter the seal leg, the density of the tar is lowered and wet tar siphons out, illustrating the instability of the hydrostatic balance between seal leg and decanter contents. Moreover, there are time lag effects which make manual control virtually impossible. These difficulties often result in operation with too small a tar inventory in the decanting tank, insufficient settling time for the tar and resultant poor quality of tar product, or in operation with too small a liquor inventory, insufficient settling time for the liquor and resultant separated liquor containing objectionable quantities of tar. In addition, because of the relatively rapid changes in tar content and decanting characteristics of the tar and aqueous mixture, this manual procedure requires such constant supervision that it is highly impractical. Moreover, unless the changes are promptly determined, the quality of the tar product is poor or the aqueous liquor contains excessive amounts of tar with its attendant disadvantages.

Accordingly, an object of the present invention is to provide process and apparatus for automatically controlling gravity-type decanting tanks used in effecting continuous separation of a liquid mixture of relatively light and relatively heavy immiscible and difficultly separable components.

Another object of the present invention is to provide process and apparatus for automatically controlling gravity-operated decanting tanks used in continuous separation of mixtures of tar and aqueous liquor.

Other objects and advantages of the invention will appear from a consideration of the following specification and claims.

According to the present invention, separation of a liquid mixture of relatively light and relatively heavy immiscible and difficultly separable liquid components is automatically and continuously controlled by continuously feeding the mixture into a settling zone, retaining the mixture within said zone for time sufficient to produce by gravity settling upper and lower fractions composed essentially of said relatively light and relatively heavy components, respectively, as products of the operation, continuously withdrawing said products from the settling zone at cumulative rate equal to the rate of admission of the mixture thereto and at individual rates corresponding substantially to the proportionate quantities of said relatively light and relatively heavy components in the mixture, continuously removing from said zone a sample of the upper relatively light fraction, subjecting a portion of the sample to settling conditions to segregate therefrom any relatively heavy component contained therein and to produce a second sample consisting essentially of the relatively light component, continuously comparing the densities of said samples, and responsive to the differences in densities adjusting the rate of discharge of the lower relatively heavy fraction from the settling zone by decreasing and increasing said rate as the differences in densities decrease and increase, respectively. As a result of this operation, the content and residence time of the relatively heavy component within the settling zone are modified as necessary to effect separation thereof from the relatively light component to desired extent.

The density of the sample consisting essentially of relatively light component remains substantially constant during the process of the invention, while the sample of relatively light fraction removed from the settling zone varies, depending upon the amount of relatively heavy component contained therein. As the density of the latter sample varies from a preselected value, the process of the invention provides for automatic adjustment of the density by controlling the discharge rate and residence time of the relatively heavy fraction in the settling zone and, consequently, the discharge rate and residence time of the relatively light fraction therein.

In preferred operation, the differences in densities of the sample of relatively light fraction and the sample consisting of relatively light component are employed to establish a pneumatic pressure which varies in response to the changes in the differences in densities. The pneumatic pressure is amplified and inverted and is imposed upon the relatively heavy fraction leaving the settling zone. As the pneumatic pressure increases or decreases in magnitude, it increases or decreases the content and residence time of the relatively heavy component in the settling zone.

More specifically, preferred operation involves continuously supplying a sample of relatively light fraction to a columnar settling zone and retaining it therein until any of the heavy component contained in the light fraction is settled out, continuously feeding a sample of the relatively light fraction through a second columnar zone and continuously comparing hydrostatic heads within said columnar zones at fixed levels therein. The changes in the differences between the compared hydrostatic heads in the columnar zones are employed to inversely modify a pneumatic pressure existing against the flow of the relatively heavy fraction from the settling zone, whereby the residence time of the relatively heavy fraction in the settling zone is decreased and increased in response to increases and decreases in the content thereof in the sample of relatively light fraction.

The hydrostatic heads or pressures existing in the columnar zones at the selected levels are determined by bubbling air out of the lower ends of conduits extending a fixed distance below the levels of the liquids in the columnar zones. As the hydrostatic head in each columnar zone above the point of entrance of air differs, the pressure in the conduits will also differ.

One type of apparatus which may be used in separating into relatively light and relatively heavy fractions a liquid mixture of relatively light and relatively heavy immiscible components comprises an atmospheric pressure decanting tank provided with an inlet for the introduction of said mixture of relatively light and relatively heavy components, a seal leg for the discharge of said relatively heavy fraction and overflow means for the discharge of said relatively light fraction, means for effecting continuous withdrawal of a sample of the relatively light fraction from any desired point in the decanting tank to an external differential pressure density detecting device, means for amplifying the resulting differential pressure to a magnitude varying inversely with the differential pressure, a conduit for transmitting the amplified pressure, and a pneumatic head fixed over the seal leg for receiving said transmitted amplified pressure, whereby the content and residence time of the relatively heavy component in the decanting tank are continuously and automatically controlled.

In a specific embodiment of the apparatus of the invention, the means for amplifying the differential pressure produced in the differential pressure detecting device comprises an air line provided with a nozzle, a flapper flexibly mounted on a rigid rod and adapted to move toward and away from the nozzle and two opposed bellows connected by said rigid rod and adapted to effect movement of the flapper toward or away from the nozzle in response to the differential pressure produced in the differential pressure detecting device.

In operation, a continuous sample of relatively light fraction is withdrawn from a fixed point in the decanting tank through a differential pressure density detecting device which is divided into two compartments, an outside compartment containing relatively light fraction and a central compartment containing relatively light component substantially free of relatively heavy component. A pair of standpipes provided with suitable valves and connected to a common air pressure lead extend fixed distances below the levels of the two compartments. The valves are adjusted to allow some air to bubble from the standpipes so that the pressure in the pipes is exactly the same as the pressure in the individual compartments at the levels where the immersed ends of the standpipes open therein. In effect, the air bubbles out from the lower ends of the standpipes and as the hydrostatic heads (at points of air entrance) of the relatively light component and relatively light fraction differ, the pressure in the standpipes will also differ. This difference of pressure is communicated to opposed bellows connected by a rigid rod on which a flapper is flexibly mounted. In response to the change in differential pressure, the opposed bellows move the flapper toward or away from the escape nozzle of an air line through which air is throttled. As the flapper is moved away from the nozzle, more air is released and correspondingly less air goes through a conduit leading from the air line to a pneumatic head over the seal leg. Thus, the throttled air acts to amplify and invert the differential pressure signal produced in the detecting device.

The mixture of relatively light and relatively heavy components can flow to the atmospheric pressure decanting tank at any predetermined rate, provided that the total discharge rate of the relatively light and relatively heavy fractions is substantially the same as the total charge rate.

The residence time of the relatively heavy fraction depends upon the concentration of the relatively heavy fraction in the feed mixture, the nature of the relatively heavy fraction and the size of the decanting tank. Depending upon these factors, the time of treatment for the relatively heavy fraction falls within the range of about 18 to 180 hours. Under such conditions, the residence time of the relatively light fraction averages 1 to 10 minutes.

The sample of relatively light fraction may be withdrawn from any part of the decanting tank containing that fraction, since the process of this invention is independent of the amount of relatively heavy component present therein.

As indicated above, in regard to separation of an aqueous liquor-tar mixture, the separated aqueous liquor is desirably recycled for cooling additional hot coke oven gas emanating from the coke ovens. In this connection, it is preferred to control the tar content of the aqueous liquor below about 2% by weight in order to prevent plugging the sprays through which the liquor is passed. Recycling of the aqueous liquor is desirable not only from a standpoint of process efficiency but also because it prevents steam pollution that would result from rejection of the liquor during commercial operation.

Operation in accordance with this invention has been found to permit automatic continuous separation of relatively light component from relatively heavy component to produce high quality products. Further, the present operation requires minimum supervision and provides an inherently stable system.

The present invention will be further described in connection with the accompanying drawing which illustrates in Figure 1 a vertical section of one embodiment of the apparatus of the invention in which a mixture of aqueous liquor and tar is separated and in Figure 2 an enlarged section of the density detecting and pressure amplifying device.

Referring to the drawing, an aqueous liquor-tar mixture is passed from the hydraulic main of a coke oven (not shown) wherein hot coke oven gas is cooled by spraying it with aqueous liquor. This liquor-tar mixture is passed through line 1 into the top section of an atmospheric pressure decanting tank 2. The mixture is charged to the tank at an approximately constant predetermined rate, for example, at the rate of about 2000 gallons per minute. About 18 to 180 hours, e.g. about 100 hours, are required for the tar to pass through tank 2 during which time aqueous liquor separates as an upper layer while tar separates as a lower layer. In addition, an aqueous interphase containing difficultly decantable tar is formed. This interphase comprises about 20 to 70% of total tank contents.

The aqueous liquor is discharged from tank 2 as overflow at weir 3. The tar, commonly containing as low as about 2% by volume of water, exits tank 2 through tar seal leg 4 and finally overflows at weir 5. The total discharge rate is substantially the same as the total charge rate. The aqueous liquor discharged from the tank is conveniently recirculated to the hydraulic main of the coke oven for effecting cooling of additional coke oven gas. The tar discharged from tank 2 may be collected as product tar or may be fractionally distilled in order to recover individual components of the tar.

High quality tar product and aqueous liquor containing a predetermined controlled amount of tar is obtained continuously and automatically in the following manner. A continuous sample of the liquor is passed through line 6 by means of pump 6a to a differential pressure density detecting device 7. This sample will have a density which reflects the tar content thereof. Thus, if it contains 1% (by volume) of tar, it will have a density of 1.0022 grams per milliliter as compared to a settled liquor density of about 1.0000 gram per milliliter. With higher or lower tar contents, the density will be correspondingly greater or less. Differential pressure density detecting device 7 comprises a vessel 8 from which the liquor sample overflows at weir 9. Within body 11 of the liquor and in hydrostatic balance with it settled liquor containing substantially no tar is provided in static condition in column 12. Extending fixed, e.g. equal distances, below the levels of the liquors in body 11 and column 12 are standpipes 13 and 14. These standpipes are provided with trickle valves 13a and 14a, respectively, through which air from air pressure lead 15 is bubbled. The liquor in column 12 remains substantially free of tar so that differences in tar content of liquor in surrounding body 11 are reflected in liquid level differentials as between the column and the body. Pressure differentials in the upper portions of the column and the body are transmitted to standpipes 13 and 14 and thence to an air pressure amplifying device 16.

For example, if column 11 is one meter high, a content of 1% (by volume) of tar in the liquor sample flowing through the column should increase the pneumatic pressure differential by 2.2 millimeters water gauge. If this should prove to be insufficient sensitivty, the column could be lengthened, e.g., to 5 meters, so that 1% of tar in the liquor sample would increase the differential pressure by 11 millimeters water gauge.

Amplifying device 16 comprises an air line 17 connected to air lead 15. Air is throttled through line 17 by means of throttle valve 17a and exits the line through escape nozzle 17b. The resultant pressure signal is transmitted through a conduit 18 connected to line 17. Opposed bellows 19 which are connected by a rigid rod 21 open into standpipes 13 and 14 and move laterally in response to the pressures transmitted through the standpipes. A flapper 22 is flexibly linked to rod 21 at 22a and is pivoted at 22b to cooperate flapper and nozzle by means of the opposed forces established in bellows 19. The movement of the bellows pushes flapper 22 toward or away from nozzle 17b, thus allowing more or less air to escape from the nozzle. When the flapper is pushed away from the nozzle, more air escapes through the nozzle and the air pressure in conduit 18 is lessened. On the other hand, when the flapper is pushed toward the nozzle, less air goes through the nozzle and the air pressure in conduit 18 is accordingly increased.

The air pressure in conduit 18 is then transmitted to a pressure head 23 which is positioned over an attached to tar seal leg 4. Depending on the height of the tar seal leg, this air pressure generally ranges from about 0 to 600 millimeters water gauge. This effects an increase or decrease in the rate of tar discharged through the tar seal leg, and consequently increases or decreases tar inventory and thus tar residence time. For example, when the tar content of the liquor withdrawn as a continuous sample from tank 2 is in excess of the predetermined desired value, increased pressure differentials in the upper portions of column 12 and body 11 and decreased pressure at the top of tar seal leg 4 are occasioned. This results in (1) an increase in exit from the tank of tar with respect to liquor, (2) a lowering of separated tar level in the tank and (3) an increase in tank inventory (hence of residence time) of liquor undergoing separation. On the other hand, when the tar content of the liquor is below the predetermined desired value, it results in (1) a decrease in exit from the tank of tar with respect to liquor, (2) a raising of separated tar level in the tank and (3) an increase in decanter inventory (hence of residence time) of tar undergoing separation.

Vessel 8 of density detecting device 7 is provided with a valved line 24 for removal, when necessary, of tar which may settle and build up a tar layer at the bottom of the vessel.

From the foregoing description of the detailed embodiment of this invention many advantages thereof will be apparent to those skilled in the art. The principal advantage is that maximum residence time of tar resulting in high quality tar product and liquor having predetermined limit of tar content may be obtained by an automatic, continuous and highly stable process. Another advantage is that a minimum of maintenance is required, while making most efficient utilization of available decanter volume. Many other advantages will be apparent to those skilled in the art.

The above-described process and apparatus is also used in automatically controlling the continuous separation of crude oil and water, oil and acid sludges, etc.

It is to be understood that this invention is not restricted to the present disclosure since variations may be made without departing from the scope of the invention.

I claim:
1. In the separation of a liquid mixture of relatively light and relatively heavy immiscible and difficultly separable liquid components wherein such a mixture is fed continuously into a settling zone and is retained therein for time sufficient to produce by gravity settling relatively light and relatively heavy fractions composed essentially of said relatively light and relatively heavy components, respectively, which are withdrawn from the zone as products at cumulative rate equal to the rate of feed of said mixture and at individual rates corresponding substantially to the proportionate quantities of said relatively light and relatively heavy components in said mixture, the improved method of controlling the residence time and content of said relatively heavy component in said zone and consequently the extent of separation thereof from said relatively light component, comprising discharging said relatively heavy fraction against pneumatic pressure adequate to maintain a substantial proportion thereof in said zone, increasing and decreasing the quantity of said relatively heavy component retained in said zone by varying said pneumatic pressure, continuously comparing the densities of said relatively light fraction and of a liquid consisting of said relatively light component, and decreasing and increasing said pneumatic pressure, respectively, responsive to increases and decreases in the differences in said densities.

2. The process of controlling separation into relatively light and relatively heavy fractions consisting essentially of the relatively light and relatively heavy immiscible and difficultly separable components of a mixture of the same involving continuously supplying said mixture to a settling zone, maintaining it within said zone for time sufficient to effect separation thereof into said fractions and continuously withdrawing said fractions as products from upper and lower portions of said zone, comprising supplying a sample of said relatively light fraction to a columnar settling zone and retaining it therein until any of said heavy component contained in said light fraction is settled out, continuously feeding a sample of said relatively light fraction through a second columnar zone, continuously comparing hydrostatic heads within said columnar zones at fixed levels therein, discharging said relatively heavy fraction against pneumatic pressure adequate to maintain a substantial proportion thereof in said settling zone, and modifying said pneumatic pressure inversely to changes in the differences between the compared hydrostatic heads in said columnar zones, whereby to decrease and increase the residence time of said relatively heavy component in said settling zone in response to increases and decreases in the content thereof in said sample of relatively light fraction.

3. Apparatus for continuously and automatically separating into relatively light and relatively heavy fractions a liquid mixture of relatively light and relatively heavy immiscible liquid components comprising an atmospheric pressure decanting tank, said tank being provided with an inlet for introduction of said mixture of relatively light and relatively heavy components, a seal leg for the discharge of said relatively heavy fraction and overflow means for the discharge of said relatively light fraction, means for effecting continuous withdrawal of a sample of said relatively light fraction from the decanting tank to an external differential pressure density detecting device, means for amplifying the resulting differential pressure to a magnitude varying inversely with the differential pressure, a conduit for transmitting the amplified pressure, and a pneumatic head fixed over the seal leg for receiving said transmitted amplified pressure, whereby the content and residence time of the relatively heavy component in the decanting tank are continuously and automatically controlled.

4. Apparatus for continuously and automatically separating into relatively light and relatively heavy fractions a liquid mixture of relatively light and relatively heavy immiscible liquid components comprising an atmospheric pressure decanting tank, said tank being provided with an inlet for introduction of said mixture of relatively light and relatively heavy components, a seal leg for the discharge of said relatively heavy fraction and overflow means for the discharge of said relatively light fraction, means for effecting continuous withdrawal of a sample of said relatively light fraction from the decanting tank to an external differential pressure density detecting device, means for amplifying the resulting differential pressure to a magnitude varying inversely with the differential pressure, said amplifying means comprising an air line provided with a nozzle, a flapper flexibly mounted on a rigid rod and adapted to move toward and away from said nozzle and two opposed bellows connected by said rigid rod and adapted to effect movement of the flapper in response to the differential pressure produced in the detecting device, a conduit connected to said air line for transmitting the amplified pressure, and a pneumatic head fixed over the seal leg for receiving said transmitted amplified pressure, whereby the content and residence time of the relatively heavy component in the decanting tank are continuously and automatically controlled.

5. A process for the separation of a liquid mixture of relatively light and relatively heavy immiscible and difficultly separable liquid components, which comprises continuously feeding such a mixture into a settling zone, retaining the mixture within said zone for time sufficient to produce by gravity settling relatively light and relatively heavy fractions composed essentially of said relatively light and relatively heavy components, respectively, continuously withdrawing said fractions from said zone as products at cumulative rate equal to the rate of admission of said mixture thereto and at individual rates corresponding substantially to the proportionate quantities of said relatively light and relatively heavy components in said mixture, controlling the residence time and content of said relatively heavy component in said zone, and consequently the extent of separation thereof from said relatively light component, by discharging said relatively heavy fraction against pneumatic pressure adequate to maintain a substantial proportion thereof in said zone, and effecting increase or decrease in the amount of relatively heavy component contained in said zone by varying said pneumatic pressure as required by variation in settling characteristics of the mixture of relatively light and relatively heavy components.

6. Apparatus for continuously and automatically separating into relatively light and relatively heavy fractions a liquid mixture of relatively light and relatively heavy immiscible liquid components, comprising an atmospheric pressure decanting tank, said tank being provided with an inlet for introduction of said mixture of relatively light and relatively heavy components, a seal leg for the discharge of said relatively heavy fraction, overflow means for the discharge of said relatively light fraction, pneumatic pressure means for regulating the discharge of said relatively heavy fraction from said seal leg and means for varying said pneumatic pressure as required by variation in settling characteristics of the mixture of relatively light and relatively heavy components.

References Cited in the file of this patent

UNITED STATES PATENTS

| | | |
|---|---|---|
| 654,965 | Franke | July 31, 1900 |
| 2,328,460 | Kidd | Aug. 31, 1943 |
| 2,588,621 | Eckman | Mar. 11, 1952 |